United States Patent [19]
Fox et al.

[11] Patent Number: 5,221,468
[45] Date of Patent: Jun. 22, 1993

[54] PNEUMATICALLY-OPERATED FILTERING APPARATUS WITH FILTER MOVEMENT CONTROLLED BY LEVEL SENSOR

[75] Inventors: Robert J. Fox, Bowling Green; Merlin P. Hoodlebrink, Bradner, both of Ohio

[73] Assignee: Clarmatic Industries, Inc., Pemberville, Ohio

[21] Appl. No.: 814,487

[22] Filed: Dec. 30, 1991

[51] Int. Cl.⁵ .......................................... B01D 33/044
[52] U.S. Cl. ........................... 210/97; 210/122; 210/123; 210/387; 210/401
[58] Field of Search .......... 210/104, 122, 123, 387, 210/400, 401, 97, 744, 780

[56] References Cited

U.S. PATENT DOCUMENTS

| | | | |
|---|---|---|---|
| Re. 32,135 | 5/1986 | Creps et al. | 210/400 |
| 3,087,620 | 4/1963 | Hirs | 210/387 |
| 4,137,169 | 1/1979 | El-Hindi | 210/400 |
| 4,448,683 | 5/1984 | Green | 210/387 |
| 4,477,350 | 10/1984 | Brandt et al. | 210/401 |
| 4,844,798 | 7/1989 | Fox | 210/387 |
| 4,865,724 | 9/1989 | Brandt et al. | 210/401 |
| 5,112,485 | 5/1992 | Hirs | 210/387 |

Primary Examiner—Joseph W. Drodge
Attorney, Agent, or Firm—Allen D. Gutchess, Jr.

[57] ABSTRACT

Filtering apparatus employs both pneumatic controls and a pneumatic drive to eliminate all electrical components. The filtering apparatus includes a perforate plate and a tank with a strip of filtering media supported on the plate. Contaminated liquid is supplied from above and clean liquid is removed from below the filtering media and plate. The filtering media is advanced across the plate by conveying apparatus. The pneumatic drive for the conveying apparatus is operated by pneumatic controls and a float which actuates the drive when the liquid in the tank rises to a predetermined level as the filtering media becomes plugged. The drive is shut off when the liquid drops to a lower predetermined level.

17 Claims, 3 Drawing Sheets

PNEUMATICALLY-OPERATED FILTERING APPARATUS WITH FILTER MOVEMENT CONTROLLED BY LEVEL SENSOR

This invention relates to pneumatically operated and controlled filtering apparatus.

Filtering apparatus embodying the invention includes a tank, a perforate plate or grate extending across a lower portion of the tank, a strip of filtering media supplied by a roll of same above an end of the tank, and means for advancing the filtering media through the tank and across the plate. The filtering media is moved across the plate as it becomes plugged from contaminants in liquid supplied to the tank and is carried outside the tank where it is suitably collected. Contaminated liquid is supplied to the tank and clean liquid is removed from a lower portion of the tank below the perforate plate by gravity. The means for advancing the filtering media across the plate includes a conveyor with a lower run located above the plate with the conveyor having suitable flight bars or cleats thereon for engaging the filtering media and advancing it. The conveyor is driven through drive sprockets or rolls located above and beyond the end of the tank opposite the end having the supply roll of filtering media.

The conveyor drive and all of the controls for the filtering apparatus in accordance with the invention are pneumatically operated. The conveyor sprockets are driven by a pneumatically-operated ram. This can be achieved through a one-way clutch and an arm which are oscillated by the pneumatic ram to incrementally drive a drive shaft on which the sprockets are mounted. The operation of the pneumatic ram is controlled through pneumatic controls of a pneumatic valve which is operated by a float within the tank.

In the operation of the filtering apparatus, the filtering media is normally in a stationary position on the perforate plate. As contaminated liquid flows through the filtering media by gravity, the filtering media gradually becomes plugged with contaminants, causing a rise in the level of the liquid in the tank. When the liquid reaches a predetermined level, the float causes the pneumatic valve to open and, through the pneumatic controls, causes a piston rod of the pneumatic ram, which rod is connected to the one-way clutch arm, to reciprocate. This advances the filtering media so that fresh media is positioned over the perforate plate. The level of the contaminated liquid thereby gradually drops until the float reaches a predetermined lower position. It then shuts the pneumatic valve and the controls stop the operation of the pneumatic ram until the liquid again rises to the upper predetermined level. The pneumatic controls are entirely operated by air and include a pilot-air actuated valve, flow-sensing valves, and flow control valves, which will be discussed in more detail subsequently.

By using solely air for the conveyor drive and controls, the cost of the filtering apparatus is substantially and significantly reduced. The pneumatic operation and controls eliminate an electric motor, a starter, a gear reducer drive, conveyor overload protection, and an electric float switch, all of which must meet rigid JIC specifications.

It is, therefore, a principal object of the invention to provide filtering apparatus with a pneumatic drive and controls having the advantages set forth above.

Many other objects and advantages of the invention will be apparent from the following detailed description of a preferred embodiment thereof, reference being made to the accompanying drawings, in which.

Figure 1:
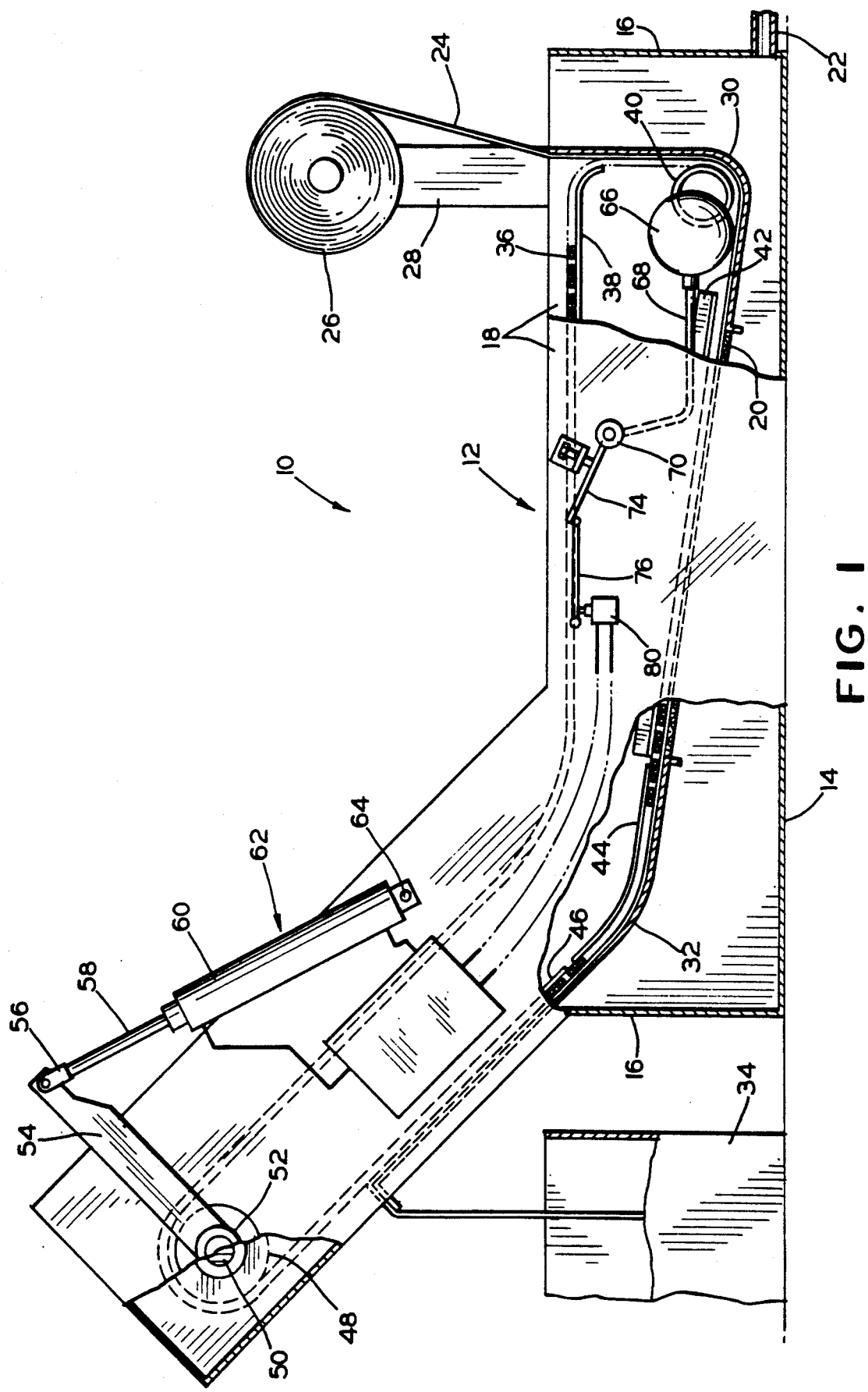
FIG. 1 is a somewhat schematic overall side view in elevation, with parts broken away and with parts in section, of filtering apparatus in accordance with the invention.

Referring to FIG. 1, filtering apparatus according to the invention is indicated at 10 and includes a main tank 12. The tank has a bottom wall 14, end walls 16, and side walls 18. A perforate plate or grate 20 is supported above the bottom wall 14 of the tank 12 and a drain line 22 removes clean liquid from the tank 12 below the plate 20.

Filtering media 24 is fed from a supply roll 26 mounted on a stand 28. The media 24 is carried down into the tank 12 along a back plate 30 across the perforate plate 20, and up a supporting plate 32 beyond which it drops into a receptacle 34.

The filtering media 24 is moved by a conveyor chain 36 having suitable flight bars or cleats which engage the filtering media. The chain 36 travels over a supporting plate 38 near the back plate 30 and around a roller 40. From here, the chain 36 travels under side bars 42, a guide plate 44 and a pressure plate 46 to the upper left end of the filtering apparatus. The chain 36 is driven by drive sprockets 47 which are affixed to a drive shaft 50. A commercially-available one-way clutch 52 is mounted on the drive shaft 50 beyond the near side wall 18 of the tank 12 and a drive arm 54 extends upwardly from the one-way clutch 52. The sprockets 48 are incrementally moved in a clockwise direction when the drive arm 54 is oscillated. The arm 54 is pivotally connected through a clevis 56 to a piston rod 58 extending from a cylinder 60 of a pneumatically-operated ram indicated at 62. The lower end of the cylinder 60 is pivotally mounted on the nearer side wall 18 of the tank through a pivot pin 64. The sprockets 48 are incrementally moved once each time the piston rod 58 reciprocates back and forth once.

Figure 2:
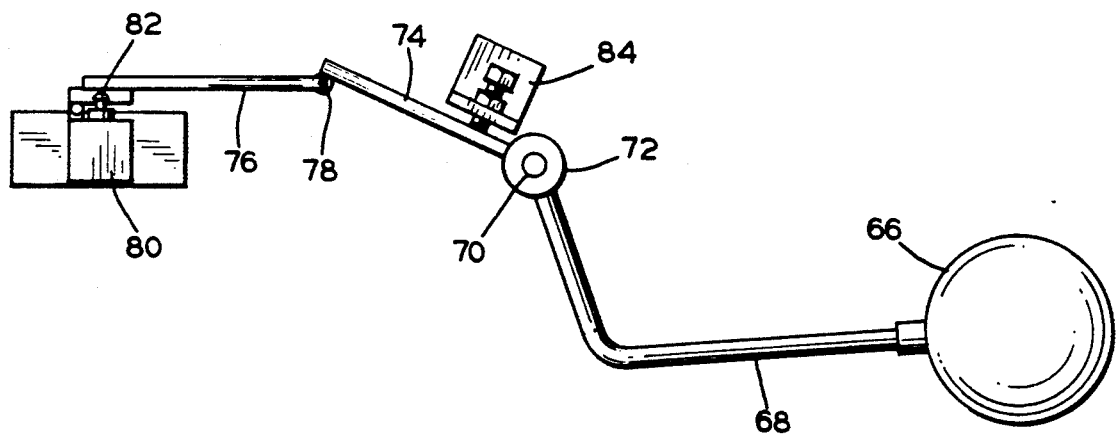
FIG. 2 is a somewhat schematic enlarged view in elevation of a float and pneumatic valve controlled thereby embodied in the apparatus of FIG. 1.

Operation of the pneumatically-operated ram 62 is controlled by a float 66 (FIGS. 1 and 2). The float is affixed to the end of a float arm 68 which, in turn, is affixed to a shaft 70 which extends outside the nearer side wall 18 of the tank. A float adjustment collar 72 is mounted on the shaft and an operating arm 74 extends therefrom. This arm can engage a float switch arm 76 through a roller 78. The arm 76, in turn, opens and closes a pneumatic float valve 80 through a button 82. A differential adjustment bolt 84 is used to change the difference in the levels of the liquid in the tank 12 at which the float 66 is caused to open and to close the pneumatic valve 80.

Figure 3:
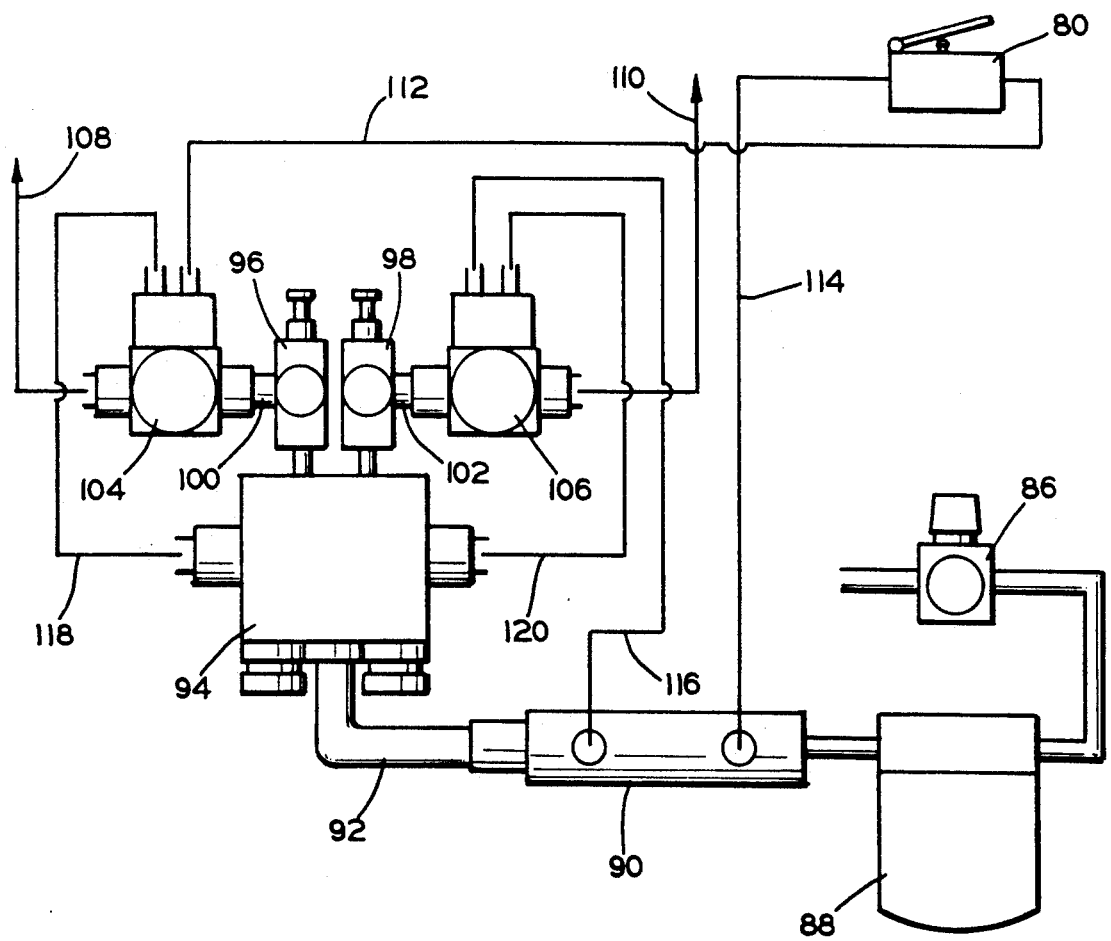
FIG. 3 is a somewhat schematic view of the pneumatic controls employed with the filtering apparatus.
Figure 4:
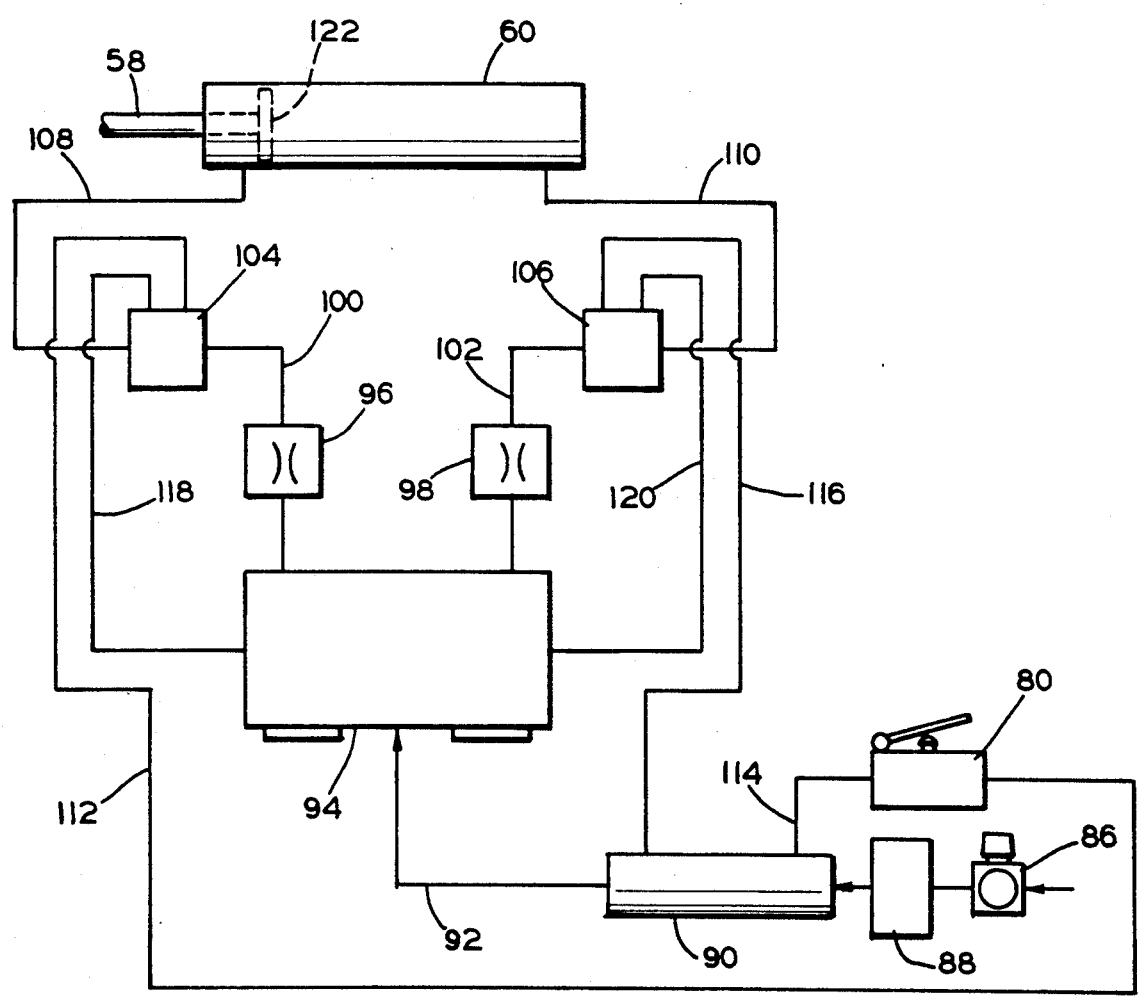
FIG. 4 is a diagrammatic view on the controls shown in FIG. 3.

The pneumatic controls for the pneumatically-operated ram 62 are shown schematically in FIG. 3 and diagrammatically in FIG. 4. Gas, preferably air, is supplied through a pressure regulator 86 and a coalescer 88, which removes any water from the air, to a manifold 90. Main air is supplied through a line 92 from the manifold to a pilot-air actuated or shuttle valve 94. From here, the air is selectively supplied through one of two flow control valves 96 and 98, one of two lines 100 and 102, one of two sensing or pressure-sensitive valves 104 and 106, and one of two lines 108 and 110 to the rod end of the cylinder 60 or to the blind end of the cylinder.

Pilot air for the sensing valve 104 is supplied through a line 112 connected with the float valve 80, with pilot air supplied to the float valve 80 through a line 114 from the manifold 90. The sensing valve 106 receives pilot air directly through a line 116 from the manifold 90. A pilot air line 118 connects the sensing valve 104 with one end of the pilot-air actuated valve 94 and a line 120 similarly connects the valve 106 with the other end of the pilot-air actuated valve 94. The sensing valves 104 and 106 are commercially-available devices, as are all of the valves and controls of FIG. 3. The sensing valves 104 and 106, communicating with the ends of the cylinder 60, detect the disappearance of the exhaust back pressure of the cylinder 60 as a piston 122 of the rod 58 reaches the ends of its stroke. At that time, the valve 104 or 106 opens to supply the pilot air through the line 118 or 120 to the pilot-air actuated valve 94, causing the valve to shift.

In operation, with the conveyor stopped, the piston rod 58 is in its extended position relative to the pneumatic cylinder 60. As the filtering media 24 plugs with contaminants, the liquid level in the tank 12 rises and, when reaching a predetermined level, the float 66 opens the pneumatic float valve 80 to supply pilot air to the sensing valve 104. Pilot air is then supplied through the line 118 to shift the valve 94. Main air is then supplied through the pilot-air actuated valve 94 to the rod end of the cylinder 60 to retract the piston rod 58. When the piston 122 reaches the blind end of the cylinder, the sensing valve 106 supplies pilot air through the line 120 to the right end of the pilot-air actuated valve 94, causing it to shift to supply air to the blind end of the cylinder to extend the piston rod 58 again. The sequence continues, causing the conveyor to advance the filtering media 24 until the liquid drops to a predetermined level. At that time, the pneumatic float 80 closes and the sequence stops when the rod 58 reaches the extended position again and air to the sensing valve 104 is shut off.

From the above, it will be seen that both the drive for the filtering apparatus and the controls are entirely pneumatically operated. This results in a substantial saving in the cost of the apparatus. Various electric components heretofore required are eliminated, including an electric motor, a starter for the motor, a gear reducer drive, conveyor overload protection, and an electric float switch. These all must meet the rigid JIC specifications and are quite costly. Maintenance can also be reduced and simplified.

Various modifications of the above-described embodiment of the invention will be apparent to those skilled in the art, and it is to be understood that such modifications can be made without departing from the scope of the invention, if they are within the spirit and the tenor of the accompanying claims.

We claim:

1. Apparatus for separating contaminants from liquid by passing the liquid by gravity through filtering media, said apparatus comprising a tank, a perforate plate extending across a portion of said tank, a strip of filtering media, a portion of which is supported on said perforate plate, means for removing clean liquid from said tank, a liquid level sensing float in said tank, a float valve, means connecting said float valve and said float with said float valve being open when said float is in one predetermined position and said float valve being closed when said float is in a second predetermined position below said one predetermined position, a pneumatically-operated ram having a cylinder and a piston rod, means connected to said piston rod to advance said filtering media across said perforate plate when said piston rod is moved in a predetermined direction, an air actuated valve connected to ends of said cylinder to selectively supply air to one end of said cylinder when in a first condition and to the other end of said cylinder when in a second condition, first and second pressure-sensitive valves connected to said air actuated valve for changing the condition of said air actuated valve, said float valve supplying air to one of said pressure-sensitive valves when said float valve is open to change the condition of said air actuated valve to direct the supply of air to the other end of said cylinder and move said piston rod.

2. Apparatus according to claim 1 wherein said first and second pressure-sensitive valves communicate with ends of said cylinder and open when the back pressure at the sensed end of said cylinder diminishes.

3. Apparatus according to claim 2 wherein a constant supply of air is supplied to the other of said pressure-sensitive valves whereby said piston rod is at an extremity of its stroke when said float valve is closed.

4. Apparatus according to claim 1 wherein flow control valves regulate the flow of air supplied from said air actuated valve to the ends of said cylinder.

5. Apparatus according to claim 1 characterized further by a manifold, means for supplying air to said manifold, and means for constantly supplying air from said manifold to said float valve, the other of said pressure-sensitive valves, and said air actuated valve.

6. Apparatus according to claim 1 wherein said means connected to said piston rod to advance said filtering media comprises a conveyor chain engagable with said strip of filtering media, a drive sprocket for moving said conveyor chain, and means connecting said drive sprocket and said piston rod.

7. Apparatus according to claim 6 wherein said means connecting said drive sprocket and said piston rod further comprises a shaft to which said drive sprocket is affixed, a one-way clutch engagable with said shaft, and a drive arm connected to said clutch and to said piston rod.

8. Apparatus for cleaning liquid by passing the liquid by gravity through filtering media, said apparatus comprising a tank, a perforate plate extending across a portion of said tank, a strip of filtering media, a portion of which is supported on said perforate plate, means for removing clean liquid from said tank below said filtering media, a liquid level sensing float in said tank and positioned above said filtering media, a float valve, means connecting said float valve and said float with said float valve being in one condition when said float is in one predetermined position and said float valve being in a second condition when said float is in a second predetermined position below said one predetermined positions, a pneumatically-operated ram having a cylinder and a piston rod, means connected to said piston rod to advance said filtering media across said perforate plate when said ram is actuated, and pneumatic control means for actuating said pneumatic ram when said float valve is in the one condition and for stopping said pneumatic ram when said float valve is in the second condition, said means connected to said piston rod to advance said filtering media comprising a conveyor chain engagable with said strip of filtering media, a drive sprocket for moving said conveyor chain, and means connecting said drive sprocket and said piston rod.

9. Apparatus according to claim 8 wherein said first and second pressure-sensitive valves communicate with ends of said cylinder and open when the back pressure at the sensed end of said cylinder diminishes.

10. Apparatus according to claim 9 wherein a constant supply of air is supplied to the other of said pressure-sensitive valves whereby said piston rod is at an extremity of its stroke when said float valve is closed.

11. Apparatus according to claim 8 characterized further by a manifold, means for supplying air to said manifold, and means for constantly supplying air from said manifold to said float valve, the other of said pressure-sensitive valves, and said air actuated valve.

12. Apparatus according to claim 8 wherein said means connecting said drive sprocket and said piston rod further comprises a shaft to which said drive sprocket is affixed, a one-way clutch engagable with said shaft, and a drive arm connected to said clutch and to said piston rod.

13. Apparatus for separating contaminants from liquid by passing the liquid through filtering media, said apparatus comprising a tank, perforate plate means in a portion of said tank, a strip of filtering media, a portion of which is on said perforate plate means, means for removing clean liquid from said tank, means for sensing the level of liquid in said tank, pneumatically-operated means to advance said filtering media acorss said perforate plate means, and pneumatic control means for actuating said pneumatically-operated means when the liquid in said tank is at one level, as sensed by said level sensing means, and for stopping operation of said pneumatically-operated means when the liquid in said tank is at a lower level, as sensed by said level sensing means, said pneumatically-operated means comprising a ram having a cylinder and a piston rod, and means connected to said piston rod to advance said filtering media across said perforate plate means, said means connected to said piston rod to advance said filtering media comprising a conveyor chain engagable with said strip of filtering media, a drive sprocket for moving said conveyor chain, and means connecting said drive sprocket and said piston rod.

14. Apparatus according to claim 13 wherein said means connecting said drive sprocket and said piston rod further comprises a shaft to which said drive sprocket is affixed, a one-way clutch engagable with said shaft, and a drive arm connected to said clutch and to said piston rod.

15. Apparatus for cleaning liquid according to claim 13 wherein said level sensing means comprises a level sensing float in said tank positioned above said filtering media, a float valve, and means connecting said float valve and said float, with said float valve being in one condition when said float is at the one level and said float valve being in a second condition when said float is at the lower level.

16. Apparatus for cleaning liquid by passing the liquid by gravity through filtering media, said apparatus comprising a tank, a perforate plate extending across a portion of said tank, a strip of filtering media, a portion of which is supported on said perforate plate, means for removing clean liquid from said tank below said filtering media, a liquid level sensing float in said tank and positioned above said filtering media, a float valve, means connecting said float valve and said float with said float valve being in one condition when said float is in one predetermined position and said float valve being in a second condition when said float is in a second predetermined position below said one predetermined position, a pneumatically-operated ram having a cylinder and a piston rod, means connected to said piston rod to advance said filtering media across said perforate plate when said ram is actuated, and pneumatic control means for actuating said pneumatic ram when said float valve is in the one condition and for stopping said pneumatic ram when said float valve is in the second condition, said pneumatic control means comprising an air actuated valve connected to ends of said cylinder selectively to supply air to one end of said cylinder when in a first condition and to supply air to the other end of said cylinder when in a second condition, first and second pressure-sensitive valves connected to said air actuated valve for changing the condition of said air actuated valve, said float valve supplying air to one of said pressure-sensitive valves when said float valve is in the first condition to change the condition of said air actuated valve to direct the supply of air to the other end of said cylinder and move said piston rod when said one pressure-sensitive valve is open.

17. Apparatus for separating contaminants from liquid by passing the liquid through filtering media, said apparatus comprising a tank, perforate plate means in a portion of said tank, a strip of filtering media, a portion of which is on said perforate plate means, means for removing clean liquid from said tank, means for sensing the level of liquid in said tank, pneumatically-operated means to advance said filtering media across said perforate plate means, and pneumatic control means for actuating said pneumatically-operated means when the liquid in said tank is at one level, as sensed by said level sensing means, and for stopping operation of said pneumatically-operated means when the liquid in said tank is at a lower level, as sensed by said level sensing means, said pneumatic control means comprising an air actuated valve connected to ends of said cylinder selectively to supply air to one end of said cylinder when in a first condition and to supply air to the other end of said cylinder when in a second condition, first and second pressure-sensitive valves connected to said air actuated valve for changing the condition of said air actuated valve, said float valve supplying air to one of said pressure-sensitive valves when said float valve is in the first condition to change the condition of said air actuated valve to direct the supply of air to the other end of said cylinder and move said piston rod when said one pressure-sensitive valve is open.

* * * * *